United States Patent [19]

Tennent et al.

[11] Patent Number: 5,165,909

[45] Date of Patent: * Nov. 24, 1992

[54] CARBON FIBRILS AND METHOD FOR PRODUCING SAME

[75] Inventors: Howard G. Tennent, Kennett Square, Pa.; James J. Barber, Arlington, Mass.; Robert Hoch, Middle Village, N.Y.

[73] Assignee: Hyperion Catalysis Int'l., Inc., Cambridge, Mass.

[ * ] Notice: The portion of the term of this patent subsequent to May 5, 2004 has been disclaimed.

[21] Appl. No.: 593,319

[22] Filed: Oct. 1, 1990

Related U.S. Application Data

[63] Continuation of Ser. No. 871,676, Jun. 6, 1986, abandoned, which is a continuation-in-part of Ser. No. 678,701, Dec. 6, 1984, Pat. No. 4,663,230.

[51] Int. Cl.$^5$ .................... D01F 9/12; D01C 5/00; B32B 9/00
[52] U.S. Cl. ................ 423/447.3; 264/29.2; 423/447.1; 427/216; 427/249; 427/255.1; 428/367; 428/376; 428/398; 428/408; 502/5; 502/182; 502/185; 502/438
[58] Field of Search .................... 423/447.3, 447.1; 264/29.2; 502/159, 182, 185, 438; 428/367, 368, 376, 398, 408; 427/216, 221, 249, 255.1

[56] References Cited

U.S. PATENT DOCUMENTS

| | | | |
|---|---|---|---|
| 2,796,331 | 6/1957 | Kauffman et al. | 423/447.3 |
| 3,816,609 | 6/1974 | Hamner | 502/185 |
| 4,362,569 | 12/1982 | Martin | 106/307 |
| 4,391,787 | 7/1983 | Tibbetts | 423/447.3 |
| 4,394,478 | 7/1983 | Martin | 524/424 |
| 4,491,569 | 1/1985 | Tibbetts | 423/447.3 |
| 4,497,788 | 2/1985 | Bradley et al. | 423/447.3 |
| 4,518,575 | 5/1985 | Porter et al. | 423/447.3 |
| 4,534,919 | 8/1985 | McAliley et al. | 264/29.2 |
| 4,565,683 | 1/1986 | Yates et al. | 423/447.3 |
| 4,565,684 | 1/1986 | Tibbetts | 423/447.3 |
| 4,572,813 | 2/1986 | Arakawa | 264/29.2 |
| 4,583,299 | 4/1986 | Brooks | 502/185 |
| 4,591,334 | 5/1986 | Brooks | 502/185 |
| 4,642,125 | 2/1987 | Burk et al. | 48/197 R |
| 4,650,657 | 3/1987 | Brooks | 502/185 |
| 4,659,624 | 4/1987 | Yeager et al. | 423/447.1 |
| 4,663,230 | 5/1987 | Tennent | 428/376 |

(List continued on next page.)

FOREIGN PATENT DOCUMENTS

| | | |
|---|---|---|
| 0198558 | 10/1986 | European Pat. Off. . |
| 117622 | 7/1982 | Japan ................ 423/447.3 |
| 58-197314 | 11/1983 | Japan . |
| 152299 | 8/1984 | Japan . |
| 118913 | 9/1991 | Japan ................ 423/447.7 |
| 729211 | 4/1980 | U.S.S.R. . |
| 925969 | 5/1982 | U.S.S.R. . |
| 1469930 | 4/1977 | United Kingdom . |

OTHER PUBLICATIONS

"Filamentous Growth of Carbon Through Benzene Decomposition", by A. Oberlin et al.—Journal of Crystal Growth 32 (1976) pp. 335–349—North Holland Publishing Co.
Endo et al., J. Cryst. Growth, 32:335–49 (1976).
De Bokx et al., J. Catal., 96:454 (1985).
Boellard et al., J. Catal., 96:481 (1985).

(List continued on next page.)

*Primary Examiner*—Paul E. Konopka
*Attorney, Agent, or Firm*—Curtis, Morris & Safford

[57] ABSTRACT

The invention relates to carbon fibrils characterized by a substantially constant diameter, length greater than about 5 times the diameter, an ordered outer region of catalytically grown, multiple, substantially continuous layers of ordered carbon atoms having an outside diameter between about 3.5 and 70 nanometers, and a distinct inner core region. Each of the layers and the core are disposed substantially concentrically about the cylindrical axis of the fibril. The fibrils are substantially free of pyrolytically deposited thermal carbon with the diameter of the fibrils being equal to the outside diameter of the ordered outer region.

54 Claims, 6 Drawing Sheets

U.S. PATENT DOCUMENTS

| | | | |
|---|---|---|---|
| 4,701,317 | 10/1987 | Arakawa et al. | 428/408 |
| 4,710,483 | 12/1987 | Burk | 502/185 |
| 4,738,828 | 4/1988 | Brooks | 422/142 |
| 4,743,431 | 5/1988 | Brooks | 422/139 |
| 4,749,557 | 6/1988 | Yetter et al. | 423/447.3 |
| 4,767,737 | 8/1988 | Brooks | 502/185 |
| 4,770,867 | 9/1988 | Coulon et al. | 423/447.3 |
| 4,816,289 | 3/1989 | Komatsu et al. | 423/447.3 |

OTHER PUBLICATIONS

Kock et al., J. Catal., 96:468 (1985).
Baker et al., J. Catal., 64:464 (1980).
Baker et al., Carbon, 21:463 (1983).
Baker et al., J. Catal., 30:86 (1973).
Tibbetts, Why Are Carbon Filaments Tubular, J. Crystal Growth, 66:632–38 (1984).
Audier et al., J. Cryst. Growth, 55:549 (1981).
Audier et al., Carbon, 18:73 (1980).
Audier et al., J. Cryst. Growth, 63:125 (1983).
Audier et al., Carbon, 19:99 (1981).
Audier et al., Carbon, 19:217 (1981).
Tibbetts, Appl. Phys. Lett., 42 (8):666 (1983).
Tesner et al., Carbon, 8:435 (1970).
Boehm, Carbon, 11:583 (1973).
Evans et al., Carbon, 11:441 (1973).
Renshaw et al., J. Catal., 18:164 (1970).
Baird et al., Carbon, 12:591 (1974).
Robertson, Carbon, 8:365 (1970).
Weisbeck, Carbon, 9:525 (1971) (Summary).
Baird et al., Nature, 233:329 (1971).
Kandani et al., Extended Abstracts Inc. Conf. (1984).
Koyama and Endo, Applied Physics, 42: (7):690 (1973).
Koyama, Endo and Hishiyama, Jap. J. Appl. Phys., 13 (12):1933 (1974).
Oberlin, Endo, and Koyama, Carbon, 14:133 (1976).
Endo et al., Jap. J. Appl., 15(11): 2073–76 (1976).
Koyama et al., Jap. J. Appl. Phys., 11(4): 445–49 (1972).
Bradley et al., Nature, 30:770–71 (Dec. 1983).

37800X
0.5 μ

CARBON FIBRILS AND METHOD FOR PRODUCING SAME

This is a continuation of application Ser. No. 871,676 filed Jun. 6, 1986, now abandoned, which is a continuation-in-part of U.S. Ser. No. 678,701, filed Dec. 6, 1984, now U.S. Pat. No. 4,663,230, the contents of which are hereby incorporated by reference into the present application.

BACKGROUND OF THE INVENTION

This invention relates to the production of graphitic carbon fibrils having high surface area, high Young's modulus of elasticity and high tensile strength. More specifically, it relates to such fibrils grown catalytically from inexpensive, readily available carbon precursors without the need for usual and expensive graphitizing temperatures (approximately 2900° C.).

Fiber-reinforced composite materials are becoming increasingly important because their mechanical properties, notably strength, stiffness and toughness, are superior to the properties of their separate component or of other non-composite materials. Composites made from carbon fibers excel in strength and stiffness per unit weight, hence they are finding rapid acceptance in aerospace and sporting goods applications. Their high cost, however, inhibits wider use.

Carbon fibers are currently made by controlled pyrolysis of continuous filaments of precursor organic polymers, notably cellulose or polyacrylonitrile, under carefully maintained tension, which is needed to insure proper orientation of the anisotropic sheets of carbon atoms in the final filaments. Their high cost is a consequence of the cost of the preformed organic fibers, the weight loss in carbonization, the slow rate of carbonization in expensive equipment and the careful handling necessary to avoid breaks in the continuous filaments.

There has been intense development of methods of spinning and carbonizing hydrocarbon pitch fiber to reduce precursor filament cost and weight loss. So far, the pitch pre-treatment, spinning conditions and post-treatments needed to insure correct orientation of the sheets of carbon atoms in the final products have been nearly as expensive as the previously noted method involving organic polymers. Both methods require use of continuous filaments to achieve high orientation and, thereby, optimum properties. There is a practical lower limit of fiber diameter, i.e., 6 to 8 micrometers, below which fiber breakage in spinning and posttreatments becomes excessive.

An entirely distinct approach to carbon fiber formation involves the preparation of carbon filaments through the catalytic decomposition at metal surfaces of a variety of carbon-containing gases, e.g., $CO/H_2$, hydrocarbons, and acetone. These filaments are found in a wide variety of morphologies (e.g., straight, twisted, helical, branched) and diameters (e.g., ranging from tens of angstroms to tens of microns). Usually, a mixture of filament morphologies is obtained, frequently admixed with other, non-filamentous carbon (cf. Baker and Harris, *Chemistry and Physics of Carbon*. Vol. 14, 1978). Frequently, the originally formed carbon filaments are coated with poorly organized thermal carbon. Only relatively straight filaments possessing relatively large graphitic domains oriented with their c-axes perpendicular to the fiber axis and possessing little or no thermal carbon overcoat will impart the properties of high strength and modulus required in reinforcement applications.

Most reports that cite formation of filamentous carbon do not document the particular type of filaments formed, so that it is impossible to determine whether the filaments are suitable for reinforcement applications. For example, Baker et al., in British Patent 1,499,930 (1977), disclose that carbon filaments are formed when an acetylene or diolefin is decomposed over catalyst particles at 675°–775° C. No description of the structure of these filaments is given, however. In European Patent Application EP 56,004 (1982), Tates and Baker describe the formation of filamentous carbon over $FeO_x$ substrates, but again do not disclose any information concerning the structure of the carbon filaments formed. Bennett et al., in United Kingdom Atomic Energy Authority Report AERE-R7407, describe the formation of filamentous carbon atom catalytic decomposition of acetone, but also fail to give any indication of the morphology, and hence suitability for reinforcement applications, of the carbon formed.

Several groups of workers have disclosed the formation of straight carbon filaments through catalytic decomposition of hydrocarbons. Oberlin, Endo, and Koyama have reported that aromatic hydrocarbons such as benzene are converted to carbon fibers with metal catalyst particles at temperatures of around 1100° C., *Carbon* 14:133 (1976). The carbon filaments contain a well ordered, graphitic core of approximately the diameter of a catalyst particle, surrounded by an overcoat of less organized thermal carbon. Final filament diameters are in the range of 0.1 to 80 microns. The authors infer that the graphitic core grows rapidly and catalytically, and that thermal carbon subsequently deposits on it, but state that the two processes cannot be separated "because they are statistically concomitant." *Journal of Crystal Growth* 32:335 (1976). The native fibers, coated with thermal carbon, possess low strength and stiffness, and are not useful as a reinforcing filler in composites. An additional high temperature treatment at 2500°–3000° C. is necessary to convert the entire filament to highly ordered graphitic carbon. While this procedure may be an improvement on the difficult and costly pyrolysis of preformed organic fibers under tension, it suffers from the drawback that a two step process of fiber growth and high temperature graphitization is required. In addition, the authors state nothing regarding deliberate catalyst preparation, and catalyst particles appear to be adventitious. In more recent work, preparation of catalytic particles is explored, but the two processes of catalytic core growth and thermal carbon deposition are again not separated, Extended Abstracts, 16th Biennial Conference on Carbon: 523 (1983).

Tibbetts has described the formation of straight carbon fibers through pyrolysis of natural gas in type 304 stainless steel tubing at temperatures of 950°–1075° C., *Appl. Phys. Lett.* 42(8):666 (1983). The fibers are reported to grow in two stages similar to those seen by Koyama and Endo, where the fibers first lengthen catalytically and then thicken by pyrolytic deposition of carbon. Tibbetts states that these stages are "overlapping", and he is unable to grow filaments free of pyrolytically deposited carbon. In addition, Tibbetts's approach is commercially impractical for at least two reasons. First, initiation of fiber growth occurs only after slow carbonization of the steel tube (typically about ten hours), leading to a low overall rate of fiber production. Second, the reaction tube is consumed in the fiber forming process, making commercial scale-up difficult and expensive.

It has now unexpectedly been found that it is possible to catalytically convert hydrocarbon precursors to carbon filaments substantially free of pyrolytically deposited thermal carbon, and thereby to avoid the thickening stage reported in the prior art as "overlapping" and "concomitant" with the filament lengthening stage. This ability allows the direct formation of high strength fibrils useful in the reinforcement of matrices, in the preparation of electrode materials of very high surface area, and in the shielding of objects from electromagnetic radiation.

This invention concerns an essentially cylindrical discrete carbon fibril characterized by a substantially constant diameter between about 3.5 and about 70 nanometers, e.g. between about 7 and 25 nanometers, length greater than about 5 times the diameter and less than about 100 times the diameter, an outer region of multiple essentially continuous layers of ordered carbon atoms and a distinct inner core region, each of the layers and the core being disposed substantially concentrically about the cylindrical axis of the fibril. Preferably the entire fibril is substantially free of thermal carbon overcoat.

The inner core of the fibril may be hollow or may contain carbon atoms which are less ordered than the ordered carbon atoms of the outer region, which are graphitic in nature.

The fibril of this invention may be produced by treating an essentially cylindrical discrete carbon fibril, characterized by a substantially constant diameter between about 3.5 and about 70 nanometers, length greater than about $10^2$ times the diameter, an outer region of multiple essentially continuous layers of ordered carbon atoms and a distinct inner core region, each of the layers and the core being disposed substantially concentrically about the cylindrical axis of the fibril, so as to produce the carbon fibril.

The fibril of this invention may also be produced by contacting for an appropriate period of time and at a suitable pressure a suitable metal-containing particle with a suitable gaseous, carbon-containing compound, at a temperature between about 850° C. and about 1200° C., the ratio on a dry weight basis of carbon-containing compound to metal-containing particle being at least about 100:1.

A carbon fibril may also be continuously produced by continuously contacting for an appropriate period of time at a suitable pressure suitable metal-containing particles with a suitable gaseous, carbon-containing compound, at a temperature between about 850° C. and about 1200° C., and recovering the fibrils so produced. The fibrils produced by this method may be recovered in association with the metal-containing particles or, alternatively, separated from the metal-containing particles and recovered. The continuous contacting may be effected by continuously introducing the gaseous, carbon-containing compound into a reaction zone containing the metal-containing particles and continuously withdrawing the gaseous carbon-containing compound from the reaction zone, or by continuously introducing the metal-containing particles into a reaction zone containing a defined volume of the gaseous, carbon-containing compound and continuously withdrawing the metal-containing particles from the reaction zone, or by continuously introducing both the metal-containing particles and the gaseous, carbon-containing compound into a reaction zone and continuously withdrawing both from the reaction zone.

In the above-mentioned method for continuously producing carbon fibrils, the withdrawn gaseous, carbon-containing compound or the withdrawn metal-containing particles may be treated so as to remove any undesirable material, i.e. impurities or reaction by-products, and then reintroduced into the reaction zone.

It is further contemplated that a portion of the fibrils in association with the metal-containing particles may be continuously recovered, dispersed with additional metal-containing particles, and continuously reintroduced into contact with the gaseous carbon-containing compound.

The contacting of the metal-containing particle with the carbon-containing compound may be carried out in the presence of a compound, e.g. $CO_2$, $H_2$ or $H_2O$, capable of reaction with carbon to produce gaseous products. Suitable carbon-containing compounds include hydrocarbons, including aromatic hydrocarbons, e.g. benzene, toluene, xylene, cumene, ethylbenzene, naphthalene, phenanthrene, anthracene or mixtures thereof; non-aromatic hydrocarbons, e.g., methane, ethane, propane, ethylene, propylene or acetylene or mixtures thereof; and oxygen-containing hydrocarbons, e.g. formaldehyde, acetaldehyde, acetone, methanol, or ethanol or mixtures thereof; and include carbon monoxide.

The suitable metal-containing particle may be a cobalt-, nickel-, or iron-containing particle, including a particle derived from a metal salt that is thermally decomposable at a temperature below about 1200° C., having a diameter between about 3.5 and about 70 nanometers.

Such particles may be supported on a chemically compatible, refractory support, e.g., a support of alumina; carbon, including carbon fibers, carbon fibrils, or carbon plates; or a silicate, including an aluminum silicate.

The suitable metal-containing particle may be encapsulated in carbon or a carbon-containing compound of e.g., a carbide or an organic polymer, including polystyrene and starch.

In one embodiment, the surface of the metal-containing particle is independently heated, e.g. by electromagnetic radiation, to a temperature between about 850° C. and about 1800° C., the temperature of the particle being higher than the temperature of the gaseous, carboncontaining compound.

In a specific embodiment, the metal-containing particle is contacted with the carbon-containing compound for a period of time from about 10 seconds to about 30 minutes at a pressure of from about one-tenth atmosphere to about ten atmospheres. In this embodiment, the metal-containing particle is an iron-containing particle, the gaseous carbon-containing compound is carbon monoxide and the reaction temperature is between 900° C. and 1150° C. The contacting may be carried out in the presence of gaseous hydrogen. Additionally, the ironcontaining particle may be a particle derived from iron oxalate and may be supported on a chemically compatible, refractory support of e.g., carbon.

This invention also concerns a method for producing a substantially uniform plurality of essentially cylindrical, discrete carbon fibrils which comprises contacting for an appropriate period of time and at a suitable pressure, suitable metal-containing particles with a suitable gaseous, carbon-containing compound, at a temperature between about 850° C. and about 1200° C. Preferably, each of the fibrils so produced has a diameter substantially equal to the diameter of each other fibril. In one embodiment the metal-containing particles are preformed.

The fibrils are useful in composites having a matrix of e.g., an organic polymer, an inorganic polymer, a metal, an adhesive, or a ceramic material. The fibrils may be dispersed in the matrix, oriented into tows of fibrils which are dispersed in the matrix, or entangled together to form a fibril mat which is disposed in the matrix.

Another aspect of this invention concerns a "furry" fiber, a "furry" plate, or a branched fibril which comprises a carbon fiber, a carbon plate, or a carbon fibril, respectively, and a plurality of carbon fibrils adhering to the outer surface of the fiber, plate, or fibril, respectively. A method for producing furry fibers, furry plates, or branched fibrils comprises dispersing suitable metal-containing particles on the outer surface of a carbon fiber, plate, or fibril, respectively, and contacting with a suitable gaseous, carbon-containing compound for an appropriate period of time and at a suitable pressure. Composites comprising a matrix and furry fibers, furry plates, or branched fibrils may be produced by e.g., dispersion or impregnation.

Carbon fibrils (including tows of fibrils), fibril mats, furry fibers, furry plates or branched fibrils may be used to reinforce a structural material, to enhance the electrical or thermal conductivity of a material, to increase the surface area of an electrode or an electrolytic capacitor plate, to provide a support for a catalyst, or to shield an object from electromagnetic radiation.

DETAILED DESCRIPTION OF THE INVENTION

Figure 1:
FIG. 1. A dispersion of catalyst particles comprised of $Fe_3O_4$.

An essentially cylindrical carbon fibril may be produced in accordance with this invention, said fibril being characterized by a substantially constant diameter between 3.5 and about 70 nanometers, a length greater than about 5 times the diameter and less than about 100 times the diameter, an outer region of multiple layers of ordered carbon atoms and a distinct inner core region, each of the layers and the core being disposed concentrically about the cylindrical axis of the fibril. Preferably the entire fibril is substantially free of thermal carbon overcoat. The term "cylindrical" is used herein in the broad geometrical sense, i.e., the surface traced by a straight line moving parallel to a fixed straight line and intersecting a curve. A circle or an ellipse are but two of the many possible curves of the cylinder.

The inner core region of the fibril may be hollow, or may comprise carbon atoms which are less ordered than the ordered carbon atoms of the outer region. "Ordered carbon atoms," as the phrase is used herein means graphitic domains having their c-axes substantially perpendicular to the cylindrical axis of the fibril.

In one embodiment, the length of the fibril is greater than about 20 times the diameter of the fibril. In another embodiment, the fibril diameter is between about 7 and about 25 nanometers. In another embodiment the inner core region has a diameter greater than about 2 nanometers.

A method for producing a carbon fibril according to this invention comprises treating a second essentially cylindrical discrete carbon fibril characterized by a substantially constant diameter between about 3.5 and about 70 nanometers, length greater than about $10^2$ times the diameter, an outer region of multiple essentially continuous layers of ordered carbon atoms and a distinct inner core region, each of the layers and the core being disposed substantially concentrically about the cylindrical axis of the fibril.

It is contemplated that various treating means are suitable for producing the carbon fibril. In one embodiment, treating comprises fragmenting the second carbon fibril by mechanical means, e.g., grinding, milling. In another embodiment, treating comprises altering the second carbon fibril with shear forces hat are produced in a fluid medium. More specifically, the second carbon fibril is contained in a liquid or semi-liquid medium, e.g., a monomer or a matrix. The medium is subjected to processing or handling operations, e.g., extrusion, injection, or molding, so as to produce shear forces sufficient to alter the second fibril into a fibril in accordance with this invention.

Another method for producing an essentially cylindrical, discrete carbon fibril according to this invention comprises contacting for an appropriate period of time and at a suitable pressure a catalyst, i.e., a suitable discrete metal-containing particle, with a suitable precursor, i.e., a suitable gaseous, carbon-containing compound, at a temperature between about 850° C. and about 1200° C. The ratio on a dry weight basis of carbon-containing compound (precursor) to metal-containing particle (catalyst) is suitably at least about 100:1.

A method for continuously producing carbon fibrils comprises continuously contacting for an appropriate period of time and at a suitable pressure, suitable discrete, metal-containing particles (catalyst), with a suitable gaseous, carbon-containing compound, (precursor), at a temperature between about 850° C. and about 1200° C., and recovering the fibrils so produced In one embodiment, the fibrils may be recovered in association with the metal-containing particles. In another embodiment the fibrils may be separated and recovered from the particles, e.g., by extraction of the metal particles into 10% aqueous solution of hydrochloric acid. The continuous contacting in one embodiment is effected by continuously introducing the precursor into a reaction zone containing the catalyst particles and continuously withdrawing the precursor from the reaction zone, e.g., a flow tower reactor with a packed bed or fluidized bed of catalyst. In another embodiment, contacting is effected by continuously introducing the catalyst particles into a reaction zone containing the precursor and continuously withdrawing the catalyst from the reaction zone. In another embodiment, contacting is effected by continuously introducing both the catalyst particles and the precursor into a reaction zone and continuously withdrawing both from the reaction zone, e g., a continuous cocurrent or countercurrent flow tower.

In the above-mentioned method for continuously producing carbon fibrils, the withdrawn precursor, catalyst, or both may be treated so as to remove any undesirable material, e.g., impurities, inactive catalyst, or byproducts formed during fibril production, and then reintroduced into the reaction zone. In one embodiment where the precursor is carbon monoxide, the effluent gas, which is predominantly carbon monoxide, carbon dioxide and trace amounts of impurities, may be treated by purging a portion of the effluent gas and adding a relatively pure amount of carbon monoxide. Alternately, the effluent gas may be treated by scrubbing with a suitable carbon dioxide-absorbing compound such as monoethanolamine (MEA). Still another method of treatment comprises converting the carbon dioxide present in the effluent gas to carbon monoxide, e.g., by passing the effluent gas over or through a carbon source. In an embodiment where the precursor is a gaseous hydrocarbon, treatment of the effluent gas may comprise removing the hydrogen produced during fibril production. In another embodiment where the withdrawn catalyst is treated and reintroduced, treatment may comprise separating the active catalyst from the inactive catalyst by magnetic means.

In another embodiment of the continuous production of carbon fibrils, a portion of the fibrils in association with the metal-containing particles may be continuously recovered, treated with additional metal-containing particles and the fibrils so treated are continuously reintroduced into contact with the gaseous, carboncontaining compound. Treatment may comprise forming a dispersion of catalyst on the fibrils as exemplified in example 34.

It is contemplated that a variety of carbon-containing compounds are suitable as precursors when used with an appropriate combination of reaction parameters, in accordance with this invention. In one presently preferred embodiment, the precursor is carbon monoxide. In other embodiments, suitable precursors include hydrocarbons. A hydrocarbon precursor may be aromatic, e.g. benzene, toluene, xylene, cumene, ethylbenzene, naphthalene, phenanthrene, anthracene or mixtures thereof. Alternatively, the hydrocarbon may be nonaromatic, e.g. methane, ethane, propane, ethylene, propylene or acetylene or mixtures thereof. In another presently preferred embodiment, the hydrocarbon is methane based upon its availability, thermal stability and lack of toxicity. The hydrocarbon may also contain oxygen, e.g. alcohols such as methanol or ethanol, ketones such as acetone, and aldehydes such as formaldehyde or acetaldehyde or mixtures thereof.

Important reaction parameters, in addition to the particular precursor, include catalyst composition and pretreatment, catalyst support, precursor temperature, catalyst temperature, reaction pressure, residence time or growth time, and feed composition, including the presence and concentrations of any diluents (e.g., Ar) or compounds capable of reaction with carbon to produce gaseous products (e.g., $CO_2$, $H_2$, or $H_2O$). It is contemplated that the reaction parameters are highly interdependent, and that the appropriate combination of the reaction parameters will depend on the specific precursor carbon-containing compound.

It is further contemplated that a variety of transition metal-containing particles are suitable as catalysts when used with an appropriate combination of reaction parameters. In a presently preferred embodiment, the metal-containing particle comprises a particle having a diameter between about 3.5 and about 70 nanometers and contains iron, cobalt or nickel, or an alloy or mixture thereof. Suitable particles may also be derived from metal salts that thermally decompose to metallic particles or metallic oxide particles at temperatures equal to or below fibril formation temperatures, i.e. below about 1200° C. Such metal salts include carbonates, bicarbonates, nitrates, citrates, and oxalates, e.g., iron oxalate.

In one embodiment, the metal-containing particle is contacted with the carbon-containing compound in the presence of a compound capable of reaction with carbon to produce gaseous products. In one such embodiment, the compound capable of reacting with carbon is $CO_2$, $H_2$, or $H_2O$.

It is desirable that catalyst particles be of reasonably uniform diameter and that they be isolated from one another, or at least held together in only weakly bonded aggregates. The particles need not be in an active form before they enter the reactor, so long as they are readily activated through a suitable pretreatment or under reaction conditions. The choice of a particular series of pretreatment conditions depends on the specific catalyst and carbon-containing compound used, and may also depend on other reaction parameters outlined above. Exemplary pretreatment conditions are provided in the Examples which follow. The metal-containing particles may be precipitated as metal oxides, hydroxides, carbonates, carboxylates, nitrates, etc., for optimum physical form. Well-known colloidal techniques for precipitating and stabilizing uniform, very small particles are applicable. For example, the techniques described by Spiro et al. for precipitating hydrated ferric oxide into easily dispersible uniform spheres a few nanometers in diameter, are very suitable for catalyst preparation, J. Am. Chem. Soc.88(12):2721–2726(1966); 89(2):5555–5559 and 5559–5562(1967). These catalyst particles may be deposited on chemically compatible, refractory supports. Such supports must remain solid under reaction conditions, must not poison the catalyst, and must be easily separated if necessary from the product fibrils after they are formed. Alumina, carbon, quartz, silicates, and aluminum silicates such as mullite may be suitable support materials. For ease of removal, their preferred physical form is thin films or plates which can easily be moved into and out of the reactor. It is further contemplated that carbon fibers or preformed carbon fibrils may be suitable support material.

It is also contemplated that a higher productivity of carbon fibrils may be achieved by initiating fibril growth throughout the reactor volume. Method of initiating fibril growth include dispersing finely divided and evenly distributed catalyst particles throughout the reactor volume. The particles may be preformed or formed by thermolysis of a metal-containing vapor in the reactor itself. For example, iron particles may be formed from ferrocene vapor.

The reaction temperature must be high enough to cause the catalyst particles to be active for fibril formation, yet low enough to avoid significant thermal decomposition of the gaseous carbon-containing compound with formation of pyrolytic carbon. The precise temperature limits will depend on the specific catalyst system and gaseous carbon-containing compound used. For example, benzene is kinetically thermally stable to about 1000° C., methane to about 950° C., and acetylene to about 500° C. In cases where thermal decomposition of the gaseous carbon-containing compound occurs at a temperature near or below that required for an active, fibril-producing catalyst, the catalyst particle may be heated selectively to a temperature greater than that of the gaseous carbon-containing compound Such selective heating may be achieved, for example, by electromagnetic radiation.

The carbon fibril of this invention may be produced at any desirable pressure, and the optimum pressure will be dictated by economic considerations. Preferably, the reaction pressure is between one-tenth and ten atmospheres. More preferably, the reaction pressure is about atmospheric pressure.

In one embodiment, the fibril is produced by contacting for a period of time from about 10 seconds to about 30 minutes and at a pressure of about one atmosphere, a suitable iron-containing particle with gaseous carbon monoxide at a temperature of about 1000° C., the ratio on a dry weight basis of carbon monoxide to iron-containing particle being greater than about 1000:1. In another embodiment the fibril is produced by contacting for from about one minute to about five minutes and at a pressure of about one atmosphere, a suitable ironcontaining particle with benzene (gaseous) in an approximately 9:1 hydrogen: benzene mixture at a temperature of about 1100° C., the ratio on a dry weight basis of carbon-containing compound to iron-containing particle being greater than about 1000:1. In a preferred embodiment of this method, the iron-containing particle is supported on a chemically compatible, refractory support, as previously described. Preferably such refractory support is alumina.

Fibrils made according to this invention are highly graphitic as grown. The individual graphitic carbon layers are concentrically arranged around the long axis of the fiber like the growth rings of a tree, or like a scroll of hexagonal chicken wire. There is usually a hollow core a few nanometers in diameter, which may be partially or wholly filled with less organized carbon. Each carbon layer around the core may extend as much as several hundred nanometers. The spacing between adjacent layers may be determined by high resolution electron microscopy, and should be only slightly greater than the spacing observed in single crystal graphite, i.e., about 0.339 to 0.348 nanometers.

There are no methods for direct measurement of the physical properties of such small fibrils. However, the stiffness of composites containing the fibrils are those expected from the Young's moduli which have been measured on larger, well graphitized carbons.

Another aspect of this invention concerns a method for producing a substantially uniform plurality of essentially cylindrical, discrete carbon fibrils. The plurality of fibrils is substantially uniform in the sense that the diameter of each fibril is substantially equal to the diameter of each other fibril. Preferably each of the fibrils is substantially free of thermally deposited carbon. The method for producing such a plurality involves continuously contacting for an appropriate period of time and at a suitable pressure, suitable metal-containing particles, with a suitable gaseous carbon-containing compound as previously discussed, at a temperature between about 850° C. and 1200° C. By this method a substantially uniform plurality of fibrils, e.g. each having a diameter substantially equal to the diameter of each other fibril, may be obtained.

Another aspect of this invention concerns a composite which comprises carbon fibrils as described above, including composites serving as structural materials. Such a composite may also comprise a matrix of pyrolytic or non-pyrolytic carbon or an organic polymer such as a polyamide, polyester, polyether, polyimide, polyphenylene, polysulfone, polyurethane or epoxy resin, for example. Preferred embodiments include elastomers, thermoplastics and thermosets.

In another embodiment, the matrix of the composite is an inorganic polymer, e.g. a ceramic material or polymeric inorganic oxide such as glass. Preferred embodiments include plate glass and other molded glass, silicate ceramics, and other refractory ceramics such as aluminum oxide, silicon carbide, silicon nitride and boron nitride.

In still another embodiment the matrix of the composite is a metal. Suitable metals include aluminum, magnesium, lead, copper, tungsten, titanium, niobium, hafnium, vanadium, and alloys and mixtures thereof.

In still another embodiment, the matrix of the composite is an adhesive.

It is contemplated that the carbon fibrils of this invention may be dispersed into the matrix, oriented in the matrix by means of e.g., electrical fields, appropriate shearing action or combing, embedded in the matrix by e.g., impregnation, or injected into the matrix, e.g., by means of spray guns.

Carbon fibrils may also be produced in-situ in porous matrices such as ceramic material. In one embodiment, such production comprises dispersing catalyst in the ceramic matrix and catalytically growing the fibrils in the matrix by passing a gaseous, carboncontaining compound through the porous ceramic matrix.

It is further contemplated that a plurality of carbon fibrils may be prepared in such a way so as to form a fibril mat. In one embodiment of the method for continuously producing carbon fibrils, a mat may be produced by collecting or recovering the fibrils on a support plate or filter. Suitable recovery filters include surface filters, e.g. screens, and depth filters, e.g. a bed of sand or body of liquid, including a monomer or low oligomer of a polymer. In another embodiment, the fibrils may be entangled so as to form a mat.

Another aspect of this invention concerns a "furry" fiber, a "furry" plate, or a branched fibril which comprises a carbon fiber, a carbon plate, or a carbon fibril, respectively, and a plurality of carbon fibrils adhering to the outer surface of the fiber, plate, or fibril, respectively. A method for producing furry fibers, furry plates, or branched fibrils comprises dispersing suitable metal-containing particles on the outer surface of a carbon fiber, plate, or fibril, respectively, and contacting with a suitable gaseous, carbon-containing compound for an appropriate period of time and at a suitable pressure.

Another aspect of this invention concerns a composite which comprises fibril mats, furry fibers, furry plates, or branched fibrils, as described above. It is contemplated that fibril mats, furry fibers, furry plates, and branched fibrils may be disposed in a matrix of a composite by the same means described above for carbon fibrils, e.g. dispersion, impregnation, injection, etc.

The carbon fibrils, fibril mats, furry fibers, furry plates and branched fibrils are useful in various applications. One application is a method for reinforcing a structural material by incorporating therein an effective reinforcing amount of carbon fibrils, furry fibers, furry plates, or branched fibrils. Another application is a method for increasing the surface area of an electrode or electrolytic capacitor plate by attaching thereto one or more carbon fibrils, mats, furry fibers, furry plates or branched fibrils. Another application is a method for supporting a catalyst which comprises attaching a catalyst to the fibril, mat, fiber or plate of this invention. Such catalyst may be an electrochemical catalyst.

Still another application is a method of enhancing the electrical conductivity of a material. According to this method an effective electrical conductivity enhancing amount of carbon fibrils, mats, furry fibers, furry plates or branched fibrils is incorporated in the material.

A further use is a method of enhancing the thermal conductivity of a material. In this method an effective thermal conductivity enhancing amount of carbon fibrils, mats, furry fibers, furry plates or branched fibrils is incorporated in the material.

An additional use is a method of shielding an object from electromagnetic radiation by incorporating therein an effective shielding amount of carbon fibrils, mats, furry fibers, furry plates or branched fibrils.

This invention is illustrated in the examples which follow. The examples are set forth to aid in an understanding of the invention but are not intended to, and should not be construed to, limit in any way the invention as set forth in the claims which follow thereafter.

EXAMPLES

Materials

The following materials used in the examples below may be obtained from commercial sources: Benzene (reagent grade), $Fe(NO_3)_3.9H_2O$ (Baker Analyzed Crystal), $FeSO_4.7H_2O$ (Baker Analyzed Granular), $KNO_3$ (Baker Analyzed Crystal) and $NaHCO_3$ (Baker Analyzed Crystal) may all be obtained from J. T. Baker Chemical Company, Phillipsburg, N.J. CO (C. P. Grade), hydrogen ($H_2$), and argon (Ar) may be obtained from Air Products and Chemicals, Inc., Allentown, Pa. KOH (C. P. Pellets) may be obtained from Mallinckrodt Inc., Lodi, N.J. Water used in the examples was deionized Vycor ® glass tubes may be obtained from Corning Glass Works, Corning, N.Y. Ceramic combustion boats may be obtained from Coors Porcelain Co., Golden Colo. Iron oxalate crystals (99.999% iron (II) oxalate dihydrate) may be obtained from Aldrich Chemical Company, Inc., Milwaukee, Wis. Starch solution (Corn Products starch 3005) may be obtained from CPC International Inc., Englewood Cliffs, N.J. Digylcidyl ether of bisphenol A (DGEBA) (Araldite 6005) may be obtained from Ciba-Geigy Corp., Ardsley, N.Y.

Davison SMR-37-1534 SRA alumina is an α-boehmite with an average crystallite size of 15 angstroms, an average agglomerate size of 0.2 microns, and an average particle size of 15 microns.

Degussa Aluminum Oxid C is a α-alumina with a surface area of 100 m²/g, an average particle size of 200 angstroms, and an apparent bulk density of 60 g/L. Cabot Sterling R V-9348 carbon powder is a furnace black with a minimum carbon content of 99.5%, a surface area of 25 m²/g, an average particle size of 750 angstroms, and an apparent density of 16 lb/ft³.

All electron micrographs were obtained from a Zeiss EM-10 Electron Microscope.

Catalyst Preparations

Example 1: Preparation of Catalyst 1

Figure 2:
FIG. 2. A dispersion of catalyst particles comprised of $Fe_3O_4$.

A magnetite dispersion was prepared according to the method of Sugimoto and Matijevic, J. Colloid & Interfacial Sci. 74:227 (1980). Electron microscopy reveals the particle size range to be from 175 to 400 angstroms, with 260 angstroms being the approximate average (FIGS. 1 and 2).

Example 2: Preparation of Catalyst 2

Into a 4 oz wide-mouth glass jar with a magnetic stirring bar was placed 10 g Davison SMR-37-1534 SRA alumina powder. To the stirred powder 0.81 M $Fe(NO_3)_3$ in $H_2O$ was added dropwise to the point of incipient wetness. 4.1 mL was required.

Example 3: Preparation of Catalyst 3

A portion of the wet powder obtained in Example 2 was heated in the jar with stirring on a hot plate until dry. The temperature was kept below that at which $NO_x$ evolved.

Example 4: Preparation of Catalyst 4

A portion of Davison SMR-37-1534 SRA alumina powder was calcined in an air stream at 900° C. for 90 min in a Vycor ® tube. In a 4 oz wide-mouth jar with magnetic stirring bar was placed 1.9977 g of the calcined $Al_2O_3$. While it was being stirred, 0.81 M $Fe(NO_3)_3$ solution in $H_2O$ was added dropwise to incipient wetness. 0.6 mL was required. The wet powder was dried with stirring on a hot plate.

Example 5: Preparation of Catalyst 5

Into a 4-in capable serum polymerization tube was weighed 0.44 g Degussa Aluminum Oxid C (fumed $Al_2O_3$) The tube was capped and argon sparged, after which 1 mL 0.5 M KOH, 1 mL 2.0 M $KNO_3$, and 6 mL prefiltered deionized water were injected The mixture was argon sparged 5 min, then 2.0 mL 0.101 M $FeSO_4$ was injected. The mixture was sparged with argon 1 min. The tube was placed in a 90° C. oil bath and the argon sparge continued for 5 min. Sparging was discontinued and quiescent digestion begun. (The o:1 bath temperature control was faulty, and temperature rose to 105° C. The bath was cooled back to 90° C.) Total digestion time was 2 h The system on standing separated into a white precipitate and clear supernate. It was centrifuged, the supernate decanted, the precipitate resuspended in prefiltered, deionized water. This was repeated two more times The pH on the final supernate was approximately 8.5. The water was decanted, the precipitate blown semi-dry with argon, and resuspended in ethanol.

Example 6: Preparation of Catalyst 6

A portion of Davison SMR-37-1534 SRA alumina powder was calcined 2 h in an air stream at 900° C. in a Vycor ® tube. One gram of the product was placed in a capable 4-in polymerization tube and enough 1.6 M $Fe(NO_3)_3$ solution was added to cover the alumina completely. The tube was capped and evacuated until bubbling ceased. It was vented and the excess liquid filtered off through an M glass fritted filter. The moist cake was calcined in a ceramic boat for 1 h in an air stream at 500° C.

Example 7: Preparation of Catalyst 7

In a centrifuge bottle 6.06 g $Fe(NO_3)_3.9H_2O$ was dissolved in 50 mL prefiltered deionized $H_2O$. To the solution was added 2.52 g $NaHCO_3$. When foaming ceased, the solution was sparged 5 min with argon. The product $Fe_2O_3$ sol was a clear solution.

A portion of Cabot Sterling R V-9348 carbon powder was calcined in a argon stream in a Vycor boat in a mullite tube at 1100° C. for 1 h. It was cooled to room temperature under argon. Into a 4-in polymerization tube enough carbon was placed to make about 0.25 in layer. The tube was evacuated and 2 mL $Fe_2O_3$ solution was added. When bubbling ceased, the tube was vented and the suspension filtered on a M-glass fritted funnel. The cake was air-dried and heated for 1 h at 500° C. under an argon stream in a Vycor ® tube.

Example 8: Preparation of Catalyst 8

In a 4-in polymerization tube a 0.4876 g portion of calcined Cabot Sterling R V-9348 carbon powder was evacuated and 2.0 mL 0.81 M $Fe(NO_3)_3$ solution was added When bubbling ceased, the tube was vented and the cake air-dried.

Example 9: Preparation of Catalyst 9

A pellet was made by compressing Cabot Sterling R V-9348 powder in a stainless die (for making KBR discs for infra-red). 0.12 g of the pellet was evacuated in a 4-in polymerization tube and 0.05 mL of a freshlyprepared $Fe_2O_3$ sol (prepared as in Example 7) was added. The tube was vented and the solid was air-dried.

Example 10: Preparation of Catalyst 10

In a 4-in polymerization tube, 0.23 g of Davison SMR-37-1534 SRA alumina which had been calcined 2 h at 900° C. in air was evacuated and 2.0 mL freshly prepared $Fe_2O_3$ sol (prepared as in Example 7) was added. The tube was vented and the solid filtered out on an M-glass fritted filter. The cake was air-dried.

Fibril Synthesis Runs

Examples 11-33

Examples 11-33 describe fibril synthesis runs. Table 1 summarizes experimental conditions and results. The "Pretreatment Conditions" column refers to the experimental conditions to which the catalyst is exposed prior to contact with the carbon-containing gas. The "Fibrils" column indicates whether the reaction yielded carbon fibrils. Unless otherwise stated, the gaseous carbon containing compound was benzene added to the fibril forming reaction at a 9:1 hydrogen:benzene mixture. Gas flow rates were 300 mL/min. for hydrogen and argon; 300 mL/min. for carbon monoxide and 100 mL/min. hydrogen for carbon monoxide/hydrogen; 300 mL/min. argon or hydrogen through benzene at 20° C. for argon/benzene or hydrogen/benzene (approximately 9:1 volume ratio argon or hydrogen/benzene). Air and hydrogen were always separated by brief argon purge of the reactor. Experimental protocols were similar in each run and are described in detail below for Examples 11, 15, and 28.

(a) Example 11

Catalyst prepared according to the method of Example 1 was ultrasonically dispersed in water and transferred to a ceramic boat. The boat was placed in the center of a 1" Vycor ® tube in an electric furnace at room temperature. The catalyst was brought from room temperature to 500° C. over a 15 minute period under a flow of argon. At this temperature, the gas mixture was changed to a hydrogen: benzene (9:1) mixture. This composition was fed into the reactor for 60 minutes.

Figure 3:
FIG. 3. Catalyst particles encapsulated in 50–150 angstrom carbon sheaths.

The hydrocarbon flow was terminated and replaced by argon, and the reactor cooled to room temperature. The boat was removed from the tube and a quantity of carbon was scraped from it. This carbon was ultrasonically dispersed in ethanol and a 10 microliter sample was examined by electron microscopy. The micrographs revealed that most of the iron particles were encapsulated in 50 to 150 angstrom carbon sheaths (FIG. 3).

(b) Example 15

Catalyst prepared as in Example 2 was dispersed in a ceramic boat The boat was placed in a 1" Vycor ® tube in the same electric furnace as used in Example 11.

The furnace temperature was raised from room temperature to 500° C. and for 60 minutes under air. The reactor was briefly purged with argon The temperature was then raised from 500° C. to 900° C. over a 15 minute period under hydrogen and maintained at 900° C. for 60 minutes under that hydrogen flow.

Figure 4:
FIG. 4. Numerous 100–450 angstrom diameter fibrils, together with catalyst support and reaction debris.

Gas flow was then switched to benzene-saturated hydrogen for 180 minutes at 900° C. After cooling to room temperature under argon a sample was prepared according the procedure of Example 11, and examined by electron microscopy. Electron micrographs revealed numerous 100-450 angstrom diameter fibrils (FIG. 4).

(c) Example 28

Catalyst prepared as in Example 3 was dispersed in a ceramic boat The boat was placed in a 1" mullite tube in the same electric furnace as used in Example 11.

The furnace temperature was raised from room temperature to 500° C. over 15 minutes and maintained at 500° C. for 60 minutes under air. The reactor was briefly purged with argon. The temperature was then raised from 500° C. to 900° C. over a 20 minute period under hydrogen and maintained at 900° C. for 60 minutes under that hydrogen flow. The temperature was then raised still further to 1100° C. over a 20 minute period maintaining the same hydrogen flow.

Figure 5:
FIG. 5. A fibril with a diameter of approximately 250 angstroms, together with catalyst support and reaction debris.

Gas flow was then switched to benzene saturated hydrogen for 5 minutes at 1100° C. After cooling to room temperature under argon a sample was prepared according to the procedure of Example 11, and examined by electron microscopy. Electron micrographs revealed fibrils ranging in diameter from 30 to 300 angstroms (FIG. 5).

TABLE 1

| | | | | | Fibril Synthesis Runs | |
|---|---|---|---|---|---|---|
| Example No. | Growth Temp. (°C.) | Catalyst No. | Growth Time (min) | Pretreatment Conditions | Fibrils Yes | No |
| 11 | 500 | 1 | 60 | 25-500° in 15 min (Ar) | | N |
| 12 | 750 | 1[1] | 420 | 23-750° in 40 min (Ar) | | N |
| 13 | 800 | 3 | 15 | 22-500° in 15 min (air) 500° for 60 min (air) | | N |

TABLE 1-continued

| | | | Fibril Synthesis Runs | | | |
|---|---|---|---|---|---|---|
| Example No. | Growth Temp. (°C.) | Catalyst No. | Growth Time (min) | Pretreatment Conditions | Fibrils Yes | No |
| 14 | 900 | 1[2] | 180 | 500–900° in 15 min ($H_2$)<br>900° for 60 min ($H_2$)<br>900–800° in 11 min ($H_2$)<br>26–350° in 20 min ($H_2$)<br>350° for 15 min ($H_2$)<br>350–400° in 10 min (CO/$H_2$)<br>400° for 210 min (CO/$H_2$)<br>400–900° in 26 min (Ar) | Y | |
| 15 | 900 | 2 | 180 | 500° for 60 min (air)<br>500–900° in 15 min ($H_2$)<br>900° for 60 min ($H_2$) | Y | |
| 16 | 900 | 4 | 180 | 24–900° in 35 min (Ar)<br>900° for 60 min ($H_2$) | Y | |
| 17 | 900 | 3 | 15 | 80–500° in 15 min (air)<br>500° for 60 min (air)<br>500–900° in 15 min ($H_2$)<br>900 for 60 min ($H_2$) | | N |
| 18 | 900 | 3 | 60 | 22–500° in 15 min (air)<br>500° for 60 min (air)<br>500–750° in 10 min ($H_2$)<br>750° for 70 min ($H_2$)<br>750–500° in 15 min ($H_2$)<br>500° for 60 min (Ar/$C_6H_6$)<br>500° for 90 min ($H_2$)<br>500–900° in 20 min ($H_2$) | | N |
| 19 | 900 | 9 | 60 | 90–900° in 30 min ($H_2$)<br>900° for 60 min ($H_2$)<br>900° for 25 min (Ar) | | N |
| 20 | 900 | 1 | 60 | 26–900° in 25 min (Ar) | | N |
| 21 | 900 | 1 | 5 | 220–900° in 20 min (Ar) | | N |
| 22 | 1000 | 1 | 5 | 252–1000° in 30 min (Ar) | | N |
| 23 | 1000 | 1 | 120 | 31–1000° in 85 min ($H_2$/$C_6H_6$) | | N |
| 24 | 1100 | 5 | 5 | 24–500° in 15 min (Ar)<br>500–900° in 15 min ($H_2$)<br>900° for 60 min ($H_2$)<br>900–1100° in 15 min ($H_2$) | | N |
| 25 | 1100 | 10 | 1 | 24–500° in 55 min (air)<br>500° for 60 min (air)<br>500–1100° in 30 min ($H_2$)<br>100° for 30 min ($H_2$) | | N |
| 26 | 1100 | 9 | 1 | 140–500° in 10 min (Ar)<br>500° for 60 min (Ar)<br>500–1100° in 26 min ($H_2$)<br>1100° for 60 min ($H_2$) | | N |
| 27[3] | 1100 | 5 | 5 | 25–500° in 20 min (Ar)<br>500–900° in 20 min ($H_2$)<br>900° for 60 min ($H_2$)<br>900–1100° in 15 min ($H_2$) | | N |
| 28 | 1100 | 3 | 5 | 25–500° in 15 min (air)<br>500° for 60 min (air)<br>500–900° in 20 min ($H_2$)<br>900° for 60 min ($H_2$)<br>900–1100° in 20 min ($H_2$) | Y | |
| 29 | 1100 | 3 | 1 | 85–500° in 10 min (air)<br>500° for 60 min (air)<br>500–900° in 20 min ($H_2$)<br>900° for 60 min ($H_2$)<br>900–1100° in 10 min ($H_2$) | Y | |
| 30 | 1100 | 6 | 5 | 42–500° in 15 min (Ar)<br>500–900° in 15 min ($H_2$)<br>900° for 60 min ($H_2$)<br>900–1100° in 15 min ($H_2$) | Y | |
| 31 | 1100 | 3 | 5 | 26–500° in 20 min (air)<br>500° for 60 min (air)<br>500–750° in 10 min ($H_2$)<br>750° for 60 min ($H_2$)<br>750–500° in 10 min ($H_2$)<br>500° for 60 min (Ar/$C_6H_6$)<br>500° for 90 min ($H_2$)<br>500–1100° in 30 min (Ar) | Y | |
| 32 | 1150 | 8 | 1 | 98–500° in 20 min (Ar)<br>500° for 60 min (Ar)<br>500–750° in 10 min ($H_2$)<br>750° for 30 min ($H_2$)<br>750–1150° in 20 min (Ar)<br>1150° for 15 min (Ar) | | N |
| 33 | 1150 | 7 | 1 | 30–1150° in 45 min ($H_2$) | | N |

TABLE 1-continued

| | | | Fibril Synthesis Runs | | | |
|---|---|---|---|---|---|---|
| Example No. | Growth Temp. (°C.) | Catalyst No. | Growth Time (min) | Pretreatment Conditions | Fibrils Yes | No |
| | | | | 1150° for 15 min ($H_2$) | | |

Footnotes to Table 1
[1] Catalyst 1 was heated from 27° to 350° in 10 min under $H_2$, from 350° to 500° in 30 min under CO/$H_2$, held at 500° for 240 min under CO/$H_2$, and cooled to room temperature prior to use.
[2] Catalyst 1 was supported on a carbon fiber.
[3] Feed was approximately 18:1 $H_2$:$C_6H_6$.

Example 34: Dispersion of Catalyst on Fibrils (1 Carbon fibrils prepared according to Examples 11–33 may be scraped onto a sintered glass filter funnel and wetted with a freshly prepared 2% solution of starch. While still wet, the fibrils are treated with a 0.81 M Fe($NO_3$)$_3$ solution. Excess liquid is poured off and the fibrils dried in air overnight at room temperature

Example 35: Production of Branched Fibrils

A small quantity of the fibrils prepared in example 34 may be scraped into a ceramic boat and placed in a 1" alumina tube in an electric furnace Argon is passed through the tube as the temperature is increased to 1100° C. Carbon monoxide is introduced for 15 minutes. The CO flow is terminated and replaced by ar9on while cooling the reactor.

A quantity of carbon may be scraped from the ceramic boat and ultrasonically dispersed in ethanol A sample may be examined by electron microscopy to observe new carbon fibrils with diameters ranging from 50 to 300 angstroms.

Figure 6:
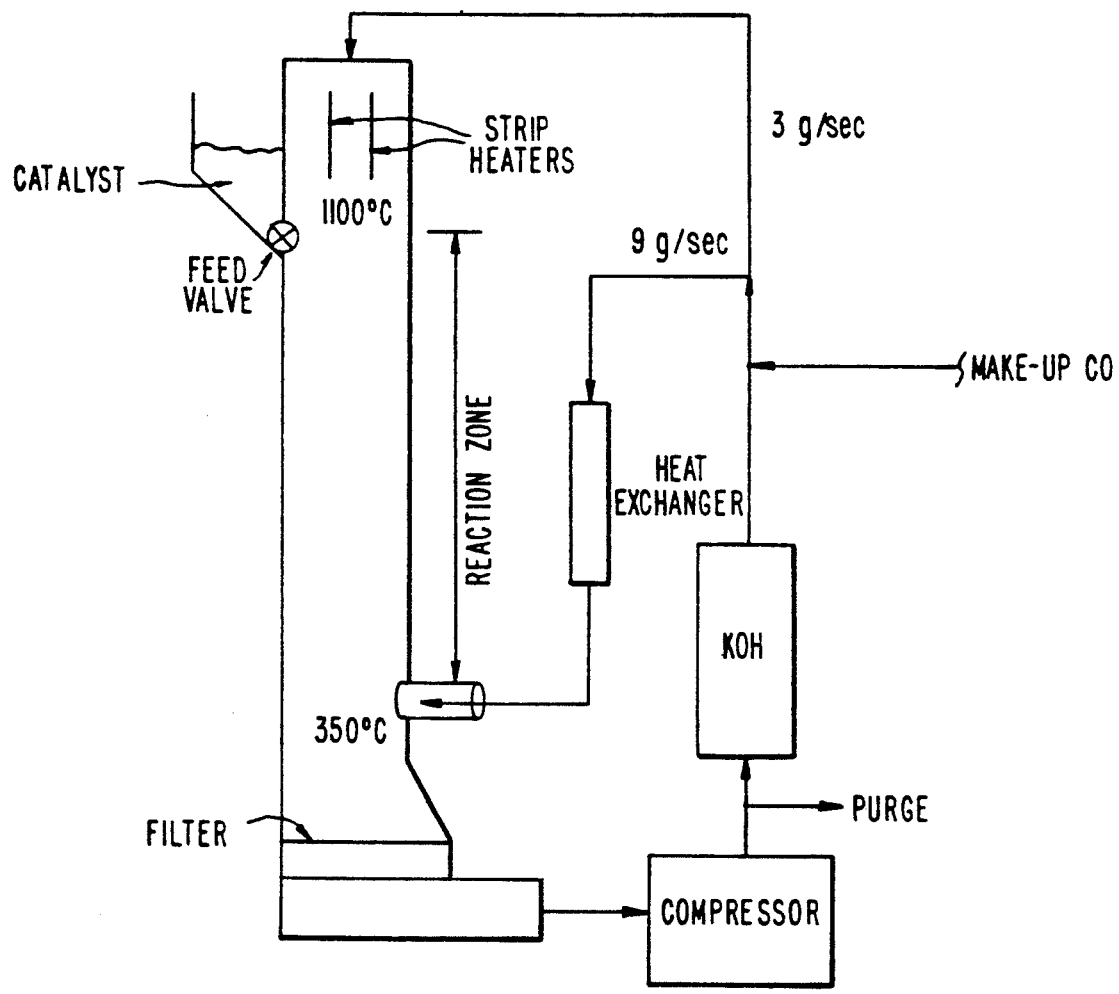
FIG. 6. Schematic Diagram of the Continuous Production of Carbon Fibrils.

Example 36: Continuous Production of Carbon Fibrils with Recycle of Precursor A stream consisting of recycle and make-up CO may be fed into a flow tower reactor along with catalyst as prepared in example 34. The flow tower is brick lined and approximately 0.30 meters in diameter and 20 meters in overall height (FIG. 6).

The mixed recycle and make-up CO stream enters the tower at the top and flows down through ceramic strip heaters which bring its temperature to 1100° C. The catalyst is fed by a star feeder into the CO stream.

Gas flow through the reaction zone is 0.16 m/sec and the zone is approximately 10 meters long. The reaction may be terminated by the injection of cold (100° C.) gas. Product fibrils are collected on a porous ceramic filter and the effluent gas is recompressed to about 1.3 atmospheres A small purge is taken from the effluent gas to balance unknown impurities formed in the reactor and contained in the feed CO. The stream passes through a KOH Bed (0.5 m in diameter × 2 m long) before the make-up CO is added. The stream then is divided; 9 g/second being diverted through a heat exchanger and the remaining 3 g/second returns to the reaction tower.

After 3 hours, the system is shut down and cooled and the ceramic filter is removed. The carbon fibrils are obtained matted to the filter. The fibrils may be scraped from the filter and used to form a composite.

Example 37: Composite Preparation

An epoxy resin system having 100 parts by weight DGEBA, 36 parts by weight DDS curing agent and 0.5 parts by weight $BF_3$ MEA accelerator may be used to wet the mat prepared in example 36 and the resulting mass dried overnight at room temperature. Ten one-inch squares are cut from the dried mat and placed in a heated die. A composite is formed by hot-pressing for 3 hours at 100° C. The composite is removed from the disc and aired for 24 hours at 120° C. and 4 hours at 175° C.

What is claimed is:

1. A substantially cylindrical discrete carbon fibril characterized by a substantially constant diameter, length greater than about 5 times the diameter, an ordered outer region of multiple, substantially continuous layers of ordered carbon atoms having an outside diameter between about 3.5 and 70 nanometers which are catalytically grown from a gaseous carbon-containing compound, said ordered carbon atoms having c-axes that are substantially perpendicular to the cylindrical axis of the fibril, and a distinct inner core region, each of the layers and the core being disposed substantially concentrically about the cylindrical axis of the fibril, wherein said fibril is substantially free of pyrolytically deposited thermal carbon formed by thermal decomposition of the gaseous carbon-containing compound, wit the diameter of said fibril being equal tot eh outside diameter of said ordered outer region.

2. A fibril of claim 1, wherein the core is hollow.

3. A fibril of claim 1, wherein the inner core region comprises carbon atoms which are less ordered than the ordered carbon atoms of the outer region.

4. A fibril of claim 1, wherein the ordered carbon atoms are graphitic.

5. A fibril of claim 1, wherein the length is greater than about 20 times the diameter.

6. A fibril of claim 1, wherein the diameter is between about 7 and 25 nanometers.

7. A fibril of claim 1, wherein the inner core region has a diameter greater than about 2 nonometers.

8. A method for producing a carbon fibril of claim 1 which comprises decreasing the length of a carbon fibril having the characteristics set forth in claim 1 but whose length is greater than about $10^2$ times the diameter.

9. A plurality of substantially discrete carbon fibrils characterized by a substantially constant diameter, length greater than about 5 times the diameter, an ordered outer region of multiple, substantially continuous layers of ordered carbon atoms having an outside diameter between about 3.5 and 70 nanometers which are catalytically grown from a gaseous carbon compound, said ordered carbon atoms having c-axes that are substantially perpendicular to the cylindrical axis of the fibril, and a distinct inner core region, each of the layers and the core being disposed substantially concentrically around the cylindrical axis of the fibrils, wherein said fibrils are substantially free of pyrolytically deposited thermal carbon formed by thermal decomposition of the gaseous carbon-containing compound, with the diameter of said fibrils being equal to the outside diameter of said ordered outer region.

10. A method for continuously producing carbon fibrils which comprises continuously contacting fibril-forming metal-containing particles with a gaseous, carbon-containing compound to catalytically grow substantially cylindrical carbon fibrils of substantially constant diameter, length greater than about 5 times the diameter, an ordered outer region of catalytically grown, multiple, substantially continuous layers of ordered carbon atoms having an outside diameter between about 3.5 and 70 nanometers, said ordered carbon atoms having c-axes that are substantially perpendicular to the cylindrical axis of the fibril, and a distinct inner core region, each of the layers and the core being disposed substantially concentrically about the cylindrical axis of the fibril, at a temperature below the thermal decomposition temperature of said carbon-containing compound to avoid significant formation of pyrolytic carbon formed by thermal decomposition of the gaseous carbon-containing compound on the catalytically grown outer region of said fibrils, and recovering the fibrils in a condition substantially free of pyrolytically deposited thermal carbon, with the diameter of said fibrils equal to the outer diameter of said ordered outer region.

11. A method of claim 10 wherein the continuous contacting is effected by continuously introducing the gaseous carbon-containing compound into a reaction zone containing the metal-containing particle and continuously withdrawing the gaseous carbon-containing compound from the reaction zone.

12. A method of claim 10 wherein the continuous contacting is effected by continuously introducing the metal-containing particles into a reaction zone containing a defined volume of the gaseous, carbon-containing compound and continuously withdrawing the metal-containing particles from the reaction zone.

13. A method of claim 10 wherein the continuous contacting is effected by continuously introducing the metal-containing particles and the gaseous, carbon-containing compound into a reaction zone and continuously withdrawing the metal-containing particles and the gaseous carbon-containing compound from the reaction zone.

14. A method of claim 13 wherein the withdrawn gaseous carbon-containing compound is treated so as to remove any undesirable material and is then continuously reintroduced into the reaction zone.

15. A method of claim 14 wherein the gaseous carbon-containing compound is carbon monoxide and the treatment comprises removing carbon dioxide form the carbon monoxide withdrawn from the reaction zone.

16. A method of claim 12 wherein the withdrawn metal-containing particles are treated so as to remove any undesirable material and recover carbon fibrils and the particles so treated are then continuously reintroduced into the reaction zone.

17. A method of claim 10 wherein the carbon fibrils are recovered in association with the metal-containing particles.

18. A method of claim 17 wherein the carbon fibrils in association with the particles are continuously recovered.

19. A method of claim 18 wherein a portion of the carbon fibrils in association with the particles so recovered are treated with additional metal-containing particles and the fibrils so treated are continuously reintroduced into contact with the gaseous carbon-containing compound.

20. A method according to claim 10 wherein the contacting of the metal-containing particles with the carbon-containing compound is carried out in the presence of a compound capable of reaction with carbon to produce gaseous products.

21. A method according to claim 20 wherein the compound capable of reacting with carbon is $CO_2$, $H_2$, or $H_2O$.

22. A method according to claim 10 wherein the carbon-containing compound is carbon monoxide.

23. A method according to claim 10 wherein the carbon-containing compound is a hydrocarbon.

24. A method according to claim 23 wherein the hydrocarbon contains oxygen.

25. A method according to claim 24 wherein the oxygen containing hydrocarbon is formaldehyde, acetaldehyde, acetone, methanol, ethanol, or mixture thereof.

26. A method according to claim 23 wherein the hydrocarbon is aromatic.

27. A method according to claim 26 wherein the aromatic hydrocarbon is benzene, toluene, xylene, cumene, ethylbenzene, naphthalene, phenanthrene, anthracene or mixtures thereof.

28. A method according to claim 23 wherein the hydrocarbon is non-aromatic.

29. A method according to claim 28 wherein the hydrocarbon is methane, ethane, propane, ethylene, propylene or acetylene or mixture thereof.

30. A method according to claim 29 wherein the hydrocarbon is methane.

31. A method according to claim 10 wherein the metal-containing particle comprises an iron-, cobalt-, or nickel-containing particle having a diameter between 3.5 and 70 nanometers.

32. A method according to claim 10 wherein the metal-containing particle is supported on a chemically compatible, refractory support.

33. A method according to claim 32 wherein the support is alumina.

34. A method according to claim 32 wherein the support is carbon.

35. A method according to claim 34 wherein the carbon is a carbon fiber.

36. A method according to claim 34 wherein the carbon is a carbon fibril.

37. A method according to claim 34 wherein the carbon is a carbon plate.

38. A method according to claim 32 wherein the support is a silicate.

39. A method according to claim 38 wherein the silicate is an aluminum silicate.

40. A method according to claim 10 wherein the metal-containing particles are derived from metal salts.

41. A method of claim 40 wherein the metal salt is iron oxalate.

42. A method according to claim 10 wherein the metal-containing particle is contacted with the carbon-containing gas for a period of time from about 10 seconds to about 30 minutes and at a pressure from about one-tenth atmospheres to about ten atmospheres, the metal-containing particle is an iron-containing particle, the gaseous, carbon-containing compound is carbon monoxide and the temperature is from about 900° C. to about 1150° C.

43. A method according to claim 42 wherein the metal-containing particle is contacted with the carbon-containing gas for a period of time of about 10 minutes and at a pressure of about one atmosphere, the carbon-containing compound is carbon monoxide and the temperature is about 1000° C.

44. A method according to claim 42 wherein the metal-containing particle is contacted with the carbon-containing gas for a period of time from about one to about five minutes and at a pressure of about one atmosphere, the carbon-containing compound is carbon monoxide and the temperature is about 1100° C.

45. A method according to claim 42 wherein the iron-containing particle is supported on a chemically compatible, refractory support.

46. A method according to claim 45 wherein the refractory support is alumina, carbon fiber or carbon fibril.

47. A method according to claim 10 wherein the metal-containing particles are independently heated to a temperature between about 850° C. and about 1800° C., the temperature or the particles being higher than the temperature of the gaseous, carbon-containing compound.

48. A method according to claim 47 wherein the particles are heated with electromagnetic radiation.

49. A carbon fibril produced according to the method of claim 10.

50. A method for producing a substantially uniform plurality of carbon fibrils which comprises continuously contacting fibril-forming metal-containing particles with a gaseous, carbon-containing compound to catalytically grow substantially cylindrical carbon fibrils of substantially constant diameter, length greater than about 5 times the diameter, an ordered outer region of catalytically grown, multiple, substantially continuous layers of ordered carbon atoms having an outside diameter between about 3.5 and b 70 nanometers, said ordered carbon atoms comprising graphitic domains whose c-axes are substantially perpendicular to the cylindrical axis of the fibril, and a distinct inner core region, each of the layers and the core being disposed substantially concentrically about the cylindrical axis of the fibril, at a temperature below the thermal decomposition temperature of said carbon-containing compound to avoid significant formation of pyrolytic carbon on the catalytically grown outer region of said fibrils, and recovering the fibrils in a condition substantially free of pyrolytically deposited thermal carbon, with the diameter of said fibrils equal to the outer diameter of said ordered outer region.

51. A substantially uniform plurality of carbon fibrils produced according to the method of claim 50.

52. A method for producing a carbon fibril which comprises the steps of contacting a fibril-forming metal-containing particle with a gaseous, carbon-containing compound to catalytically grow a substantially cylindrical carbon fibril of substantially constant diameter, length greater than about 5 times the diameter, an ordered outer region of multiple, substantially continuous layers of ordered carbon atoms having an outside diameter between about 3.5 and 70 nanometers which are catalytically grown from a gaseous carbon-containing compound, said ordered carbon atoms having c-axes that are substantially perpendicular to the cylindrical axis of the fibril, and a distinct inner core region, each of the layers and the core being disposed substantially concentrically about the cylindrical axis of the fibril, the temperature during said contacting being below the thermal decomposition temperature of the gaseous carbon-containing compound to avoid significant formation of pyrolytically deposited thermal carbon formed by thermal decomposition of the gaseous carbon-containing compound on said catalytically grown outer region; and recovering said fibril in a condition substantially free of pyrolytically deposited thermal carbon, with the diameter of said fibril equal to the outside diameter of said ordered outer region.

53. The method of claim 52 wherein said temperature is below the temperature required to thermally form layers of ordered carbon atoms.

54. The method of claim 52 wherein the ratio on a dry weight basis of carbon-containing compound to metal-containing particle is at least about 100:1.

* * * * *